(12) United States Patent
Richter et al.

(10) Patent No.: US 8,003,885 B2
(45) Date of Patent: Aug. 23, 2011

(54) CONNECTION BOX FOR SOLAR PANEL

(75) Inventors: Michael Richter, Schalksmuehle (DE); Dennis Gazke, Schalksmuehle (DE); Lothar Fuhrmeister, Schalksmuehle (DE)

(73) Assignee: Lumberg Connect GmbH, Schalksmuehle (DE)

( * ) Notice: Subject to any disclaimer, the term of this patent is extended or adjusted under 35 U.S.C. 154(b) by 176 days.

(21) Appl. No.: 12/434,745

(22) Filed: May 4, 2009

(65) Prior Publication Data

US 2009/0272559 A1    Nov. 5, 2009

(30) Foreign Application Priority Data

May 3, 2008    (DE) .......................... 10 2008 022 050

(51) Int. Cl.
*H02G 3/08* (2006.01)
(52) U.S. Cl. .............. 174/50; 174/58; 174/64; 136/244; 439/142; 439/718

(58) Field of Classification Search .................... 174/50, 174/58, 64; 136/244–246, 251; 439/135, 439/136, 142, 571, 786, 796
See application file for complete search history.

(56) References Cited

U.S. PATENT DOCUMENTS 7,097,516 B2 *    8/2006    Werner et al. ................. 439/709
* cited by examiner

*Primary Examiner* — Dhiru R Patel
(74) *Attorney, Agent, or Firm* — Andrew Wilford

(57) ABSTRACT

A box for connecting a ribbon output conductor of a solar panel with a feed cable has a base mountable on the solar panel and formed with a first hole for the ribbon output conductor and a second hole for the feed cable, a removable cover fittable with the base and forming when fitted with the base a substantially closed compartment, and two holders at the first hole oriented at a predetermined angle to each other and adapted to hold a conductive part of the feed cable in either of two positions offset by the predetermined angle relative to the first hole.

8 Claims, 4 Drawing Sheets

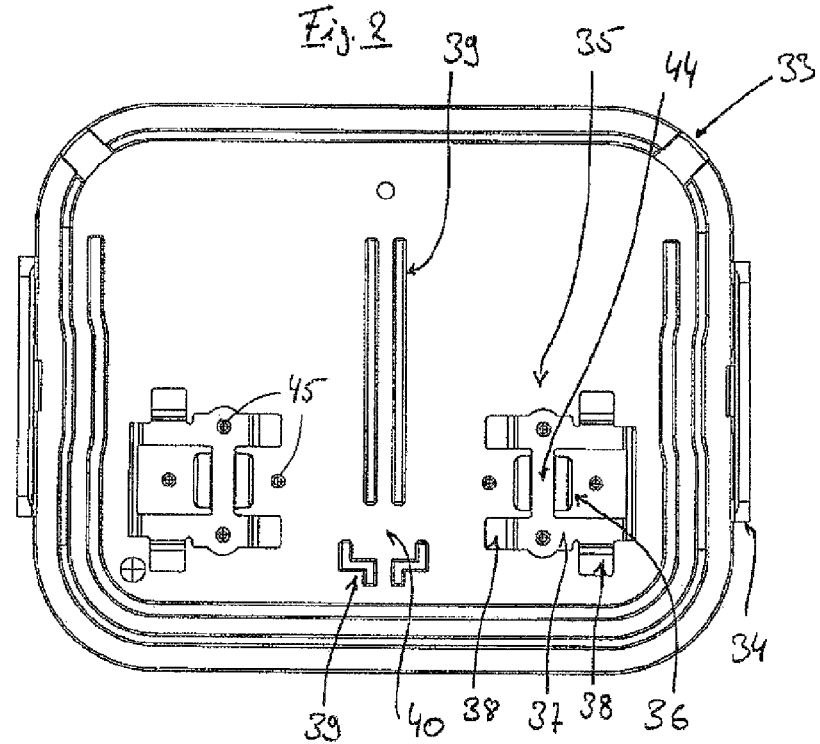

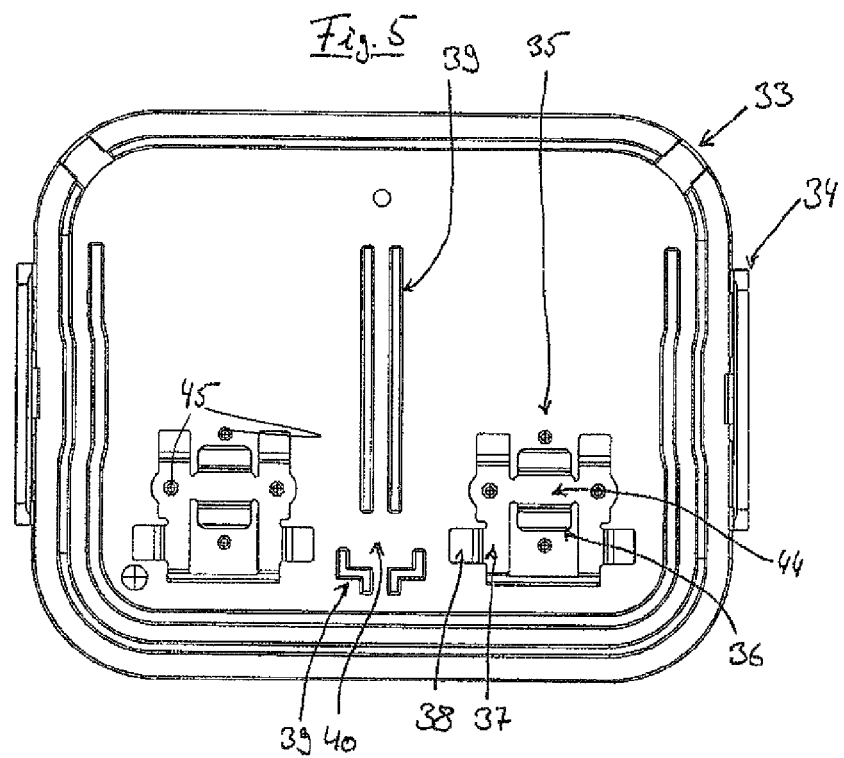
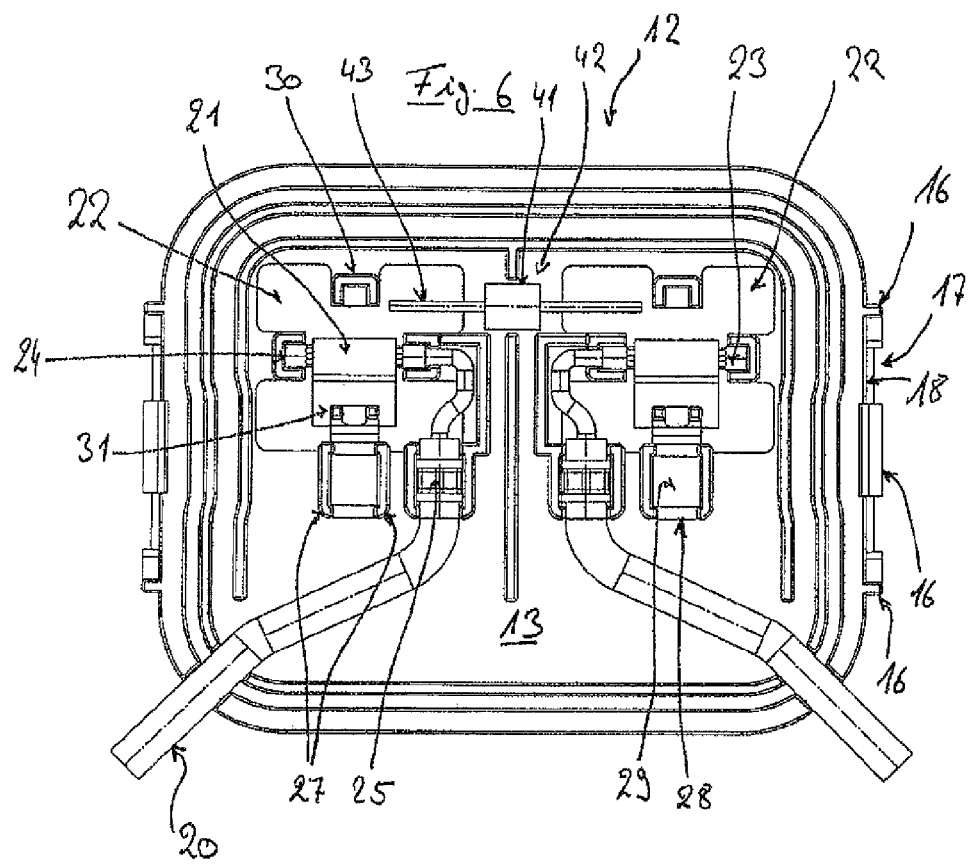

CONNECTION BOX FOR SOLAR PANEL

FIELD OF THE INVENTION

The present invention relates to a connection box. More particularly this invention concerns a connection box for a solar panel.

BACKGROUND OF THE INVENTION

A standard connection box for a solar panel has a cover and a base. The base has a first opening for a ribbon panel-output conductor and a second opening for a feed cable to be coupled to the panel-output conductor. This feed cable has a lead projecting into a compartment formed by the base to which the panel-output conductor is mounted so as to form therewith an electrical connection. Holders secure the feed cable inside the connection box in a stable manner.

Standard prior-art solar panels are known that are equipped with ribbon or strip panel-output conductors to conduct electricity generated by the panel to the feed cables. These panel-output conductors are fitted into the connection boxes and mounted there on leads of the feed cables. The leads can be components of the feed cables themselves, such as, for example, a core conductor, or also contacts provided on the feed cable. The leads are typically held in a stationary fixed fashion in the base.

Depending on the type of solar panel, the panel-output conductors extend through opening in different orientations. This means that the ribbon-type panel-output conductor is oriented horizontally in a first embodiment, while in a second embodiment it is vertical. In other words, the ribbon-type panel-output conductor in the second embodiment is angled 90° offset to the first embodiment. As a result, a supply of different connection boxes must be made that differ specifically in terms of the arrangement of the incoming leads or conductors.

OBJECTS OF THE INVENTION

It is therefore an object of the present invention to provide an improved connection box for solar panel.

Another object is the provision of such an improved connection box for solar panel that overcomes the above-given disadvantages, in particular that is usable with both embodiments of solar panels.

SUMMARY OF THE INVENTION

A box for connecting a ribbon output conductor of a solar panel with a feed cable has according to the invention a base mountable on the solar panel and formed with a first hole for the ribbon output conductor and a second hole for the feed cable, a removable cover fittable with the base and forming when fitted with the base a substantially closed compartment, and two holders at the first hole oriented at a predetermined angle to each other and adapted to hold a conductive part of the feed cable in either of two positions offset by the predetermined angle relative to the first hole.

In other words, according to the invention the base has a first holder for securing the lead of the feed cable in a first position parallel to the width direction of the ribbon-type panel-output conductor, and a second holder that can hold a lead of the feed cable in a position that is shifted at an angle to the first position.

In a first embodiment, the lead is formed by a stripped conductor of the feed cable. This region is advantageously mechanically reinforced, a useful approach to this end being mechanical reinforcement by a cable end sleeve.

One embodiment of the connection box described is advantageous which is characterized in that the angle measures 90°.

Each holder can be formed by two clips spaced relative to each other longitudinally of the lead, which clips hold the lead while spanning the opening for the panel-output conductor. Alternatively or additionally, provision is made whereby the holder is formed by a support spanning the first opening for the panel-output conductor, on which the lead rests.

It is also possible for the holder bracket to form a clamp for the lead.

One advantageous embodiment is characterized in that the first opening of the base for the panel-associated the panel-output conductors is provided between two clips forming the holder.

BRIEF DESCRIPTION OF THE DRAWING

The above and other objects, features, and advantages will become more readily apparent from the following description, reference being made to the accompanying drawing in which:

FIG. 2 is a bottom view of the cover of the first box;

FIG. 3 is a top view of the base of the first box;

FIG. 5 is a bottom view of the cover for the system shown in FIG. 4; and

FIG. 6 is a top view of the base with the arrangement of FIG. 4.

SPECIFIC DESCRIPTION

Figure 1:
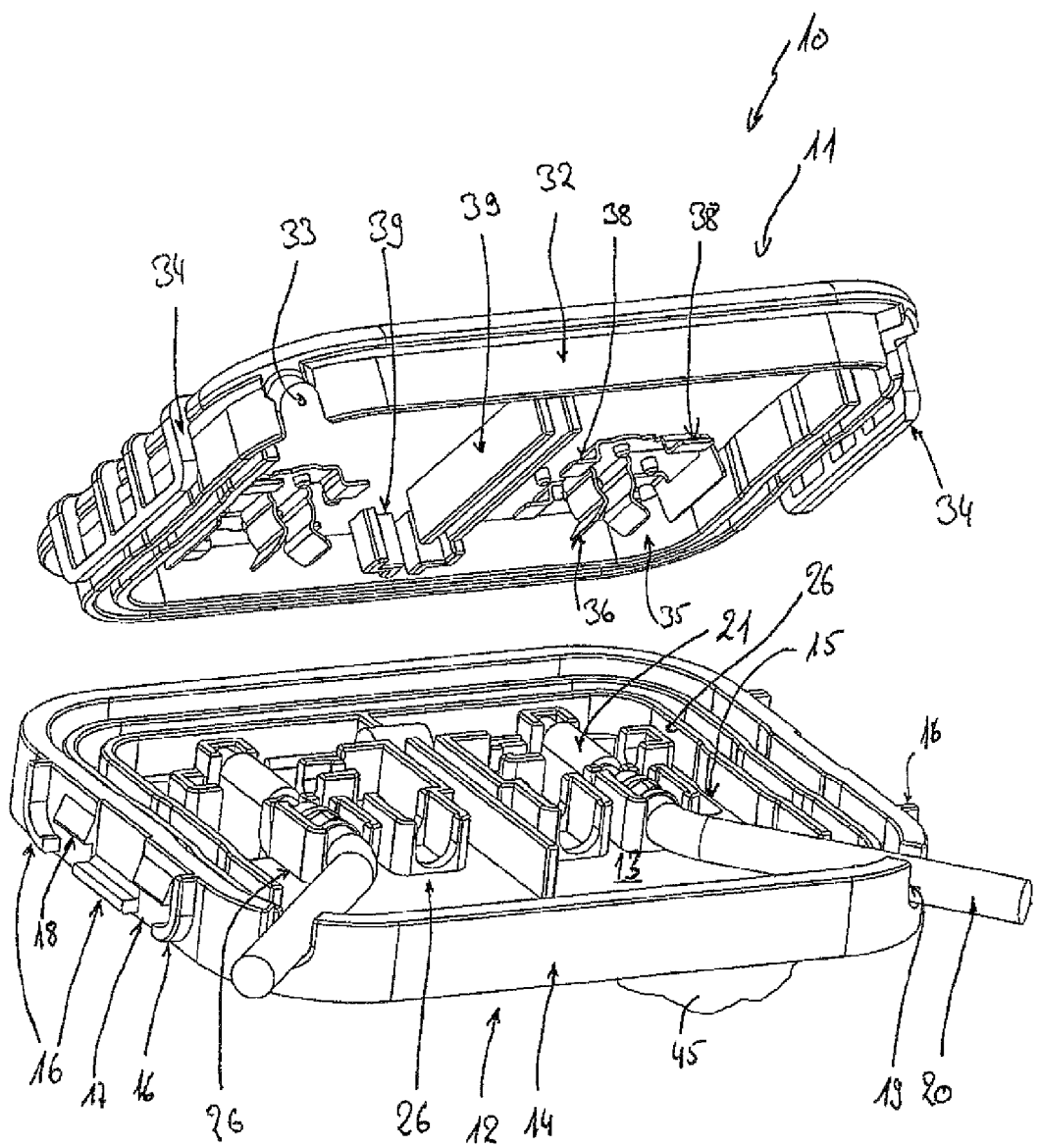
FIG. 1 is a perspective view of a connection box according to the invention in an open position.

As seen in the drawing, a connection box 10 has a cover 11 and a base 12. The base 12 is mounted on a solar panel shown diagrammatically at 45 by its bottom face that faces away from the cover 11, in particular, adhesively bonded to the solar panel 45.

This base 12 has an annular outer side wall 14 extending toward the cover 11 and delimiting with the cover 11 a compartment 15 intended to accommodate various elements. At opposite outer surfaces, the side wall 14 has locking-lug guide ridges 16 that define tool-engagement grooves 17. The locking-lug guide ridges 16 define a space inside which wedge-shaped locking lugs 18 are provided. The side wall 14 is also formed with two second holes or cutouts 19 through which feed cables 20 extend into the compartment 15 of the connection box 10. (The references to "up" and "down" being purely for convenience of description, since the box 10 is often mounted inverted on the generally downwardly facing back face of the solar panel 45.)

A generally rectangular and planar floor 13 of the base 12 also has two first X-shaped openings 22. In the base 12, panel-output ribbon conductors 21 are routed through the panel-output conductor openings 22 into the compartment 15 of the connection box 10.

The portion of each feed cable 20 extending into the compartment 15 has a stripped end 23 that in the illustrated embodiment represents a lead 24 of the respective feed cable 20. Each panel-output conductor 21 engages directly against the core end 23 of a respective one of the feed cables 20. Preferably, the core end 23 is mechanically reinforced. A possible approach for this specifically is reinforcement by a cable end sleeve 25 that functions as a strain-relief means that is provided in the section of the feed cable 20 adjacent the end 23 provided with an insulating sleeve.

The base 12 forms at each of the holes two seats or holders 26 on its face exposed in the compartment 15 that anchor the feed cable 20 inside the compartment 15. Each of these holders 26 in turn is formed by a U-shaped bracket 27 and a respective U-shaped clip 31 that extend toward the cover 11. The brackets 27 of each holder 26 are open toward each other such that they form a respective holding seat 29 through which a groove 28 extends. The width of the groove 28 approximately matches the diameter of the feed cable 20. The seat 29 accommodates the sleeve 25 crimped around the feed cable 20, thereby forming a strain relief.

Each holder 26 is a U-shaped bracket 30 and a respective clip 31 for gripping the core end 23 of the feed cable 20. The holder bracket 30 and clip 31 of each pair lie to opposite sides of the respective panel-output conductor opening 22 of the base 12. The brackets 30 for the core end 23 here again are each approximately U-shaped and functions with the respective retention clip 31 on the other side of the respective opening 22. The support brackets 30 and the respective retention clips 31 extend, like the U-shaped brackets 27, from the base 12 toward the cover 11. The support bracket 30 and respective retention clip 31 are spaced apart from each other in the direction the core end 23 extends along over the panel-output conductor opening 22 so as to accommodate the panel-output conductor opening 22 between them.

According to the invention as seen by a comparison of FIGS. 3 and 6, two pairs of these brackets 30 and clips 31 are provided, aligned 90° offset to each other, at each of the holes 22 so that as described below the feed-cable end 23 around which the conductor 21 is wrapped can be anchored to extend in either of two 90° offset positions bridging the respective hole 22.

The cover 11 shown in the drawing first of all has a circumferential collar or rim 32 extending toward the base 12 and formed with holes or cutouts 33 that correspond to the cutouts 19 of the base 12. At opposite sides, the cover 11 forms locking lugs 34 extending toward the base 12 and fittable with the base-section-associated locking-lug guide ridges 16 and locking projections 18. Inside the space defined by collar 32, contacts in the form of clips 36 are provided on the bottom face of the cover 11, the clips 36 having an approximately Ω-shaped cross-section. These clips 36 each grasp a respective base plate 37 on a bottom face of the cover 11, the base plate 37 forming contact tabs 38. A pair of parallel ridges 39 formed on the bottom side of the cover form a support seat 40 for a body 41 of a shunt diode (FIGS. 3 and 6).

When the cover 11 is placed on the base 12 to close the connection box 10, the clips 36 overlap the region of the core end 32 and of the foil-type panel-output conductor 21 mounted there and make a good electrical connection by positive engagement. The contact tabs 38 make an electrical connection with the leads 43 of the shunt diode 42. The locking projections 18 grasp the locking lugs 34 from behind and snap fit the cover 11 to the base 12.

Figure 4:
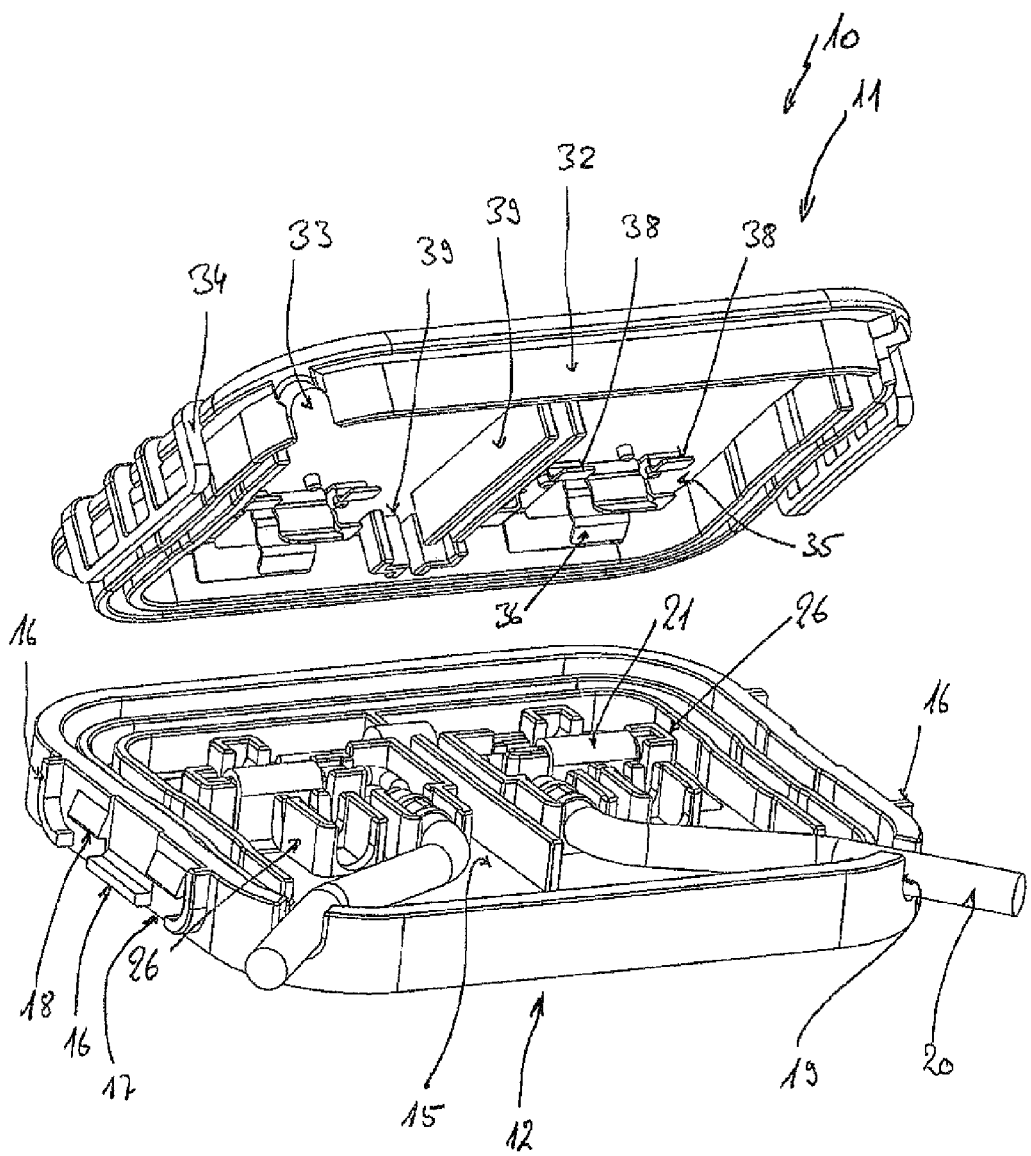
FIG. 4 is a perspective view of the box according to the invention but with a different arrangement of the internal connections.

In comparing FIGS. 3 and 6, what is noticeable is that the ends 23 of the feed cables 20 are in two different positions with an identically designed the base 12. If the orientation of the ends 23 in FIG. 3 is defined as vertical, then that of the core ends 23 in FIG. 6 can be defined as horizontal. In terms of the floor 13 of the base 12, the orientation of core end 23 has been shifted from FIG. 3 to FIG. 6 by an angle of 90°. To this end, the holders formed by the support brackets 30 and retention clips 31, are appropriately provided in the region of the panel-output conductor opening 22. Together the holders form a bearing support for the optional orientation of core end 23.

In comparing FIGS. 2 and 5, what is noticeable is that the cover-associated contacts 35 are also shifted by 90° corresponding to the orientation of core ends 23, and thus the bracket seat 44 is aligned congruently with the end 23. This always involves one and the same contacts 35 that are simply rotated 90°. To this end, the cover for both orientations has for each contact 37 four positioning studs 45 defining two stable positions. One and the same the cover can thus be fitted as required with a contact aligned to match core end 23.

Thus depending on the orientation of the flat conductor strips 21 coming out of the back of the solar panel, the feed-cable ends 23 are snapped into the appropriate set of brackets 30 and then these conductors 23 are wrapped around them. Then the contacts 37 on the cover 11 are similarly appropriately positioned and locked in place on the studs 45, and the cover 11 is closed over the base 12 to form the necessary connection with the diode 42 in the base 12.

In sum, a connection box 10 for solar panels has been presented that is suitable for solar panels that differ with regard to the orientation of the ribbon-type panel-output conductor 21 by cleverly arranging two holders, which are shifted at an angle relative to each other, for the lead 24 of the feed cable 20.

We claim:

1. A box for connecting a ribbon output conductor of a solar panel with a feed cable, the box comprising:
    a base mountable on the solar panel and formed with a first hole for the ribbon output conductor and a second hole for the feed cable, the first hole being dimensioned such that the ribbon conductor can engage through it in either of two positions at a predetermined angle to each other;
    a removable cover fittable with the base and forming when fitted with the base a substantially closed compartment; and
    two holders at the first hole oriented at the predetermined angle to each other and adapted to hold a conductive part of the feed cable in either of two positions offset by the predetermined angle and extending across the first hole such that the conductive part of the feed cable can be held by the holders in a position crosswise of the direction in which the ribbon output conductor is engaged through the first hole in either of the positions of the ribbon conductor.

2. The connection box defined in claim 1 wherein the conductive part of the feed cable is a stripped end of a conductor of the feed cable.

3. The connection box defined in claim 2 wherein the stripped end is reinforced.

4. The connection box defined in claim 3 wherein the stripped end is reinforced by a crimp sleeve.

5. The connection box defined in claim 1 wherein the angle is 90°.

6. The connection box defined in claim 5 wherein each of the holders comprises a bracket and a clip flanking the first hole and both shaped to grip the cable to each side of the conductive part.

7. The connection box defined in claim 1 wherein the base is formed with a web spanning the first opening and supporting the conductive part.

8. A box for connecting a ribbon output conductor of a solar panel with a feed cable, the box comprising:
    a base mountable on the solar panel and formed with a first hole for the ribbon output conductor and a second hole for the feed cable;

a removable cover fittable with the base and forming when fitted with the base a substantially closed compartment; and two holders at the first hole oriented at an angle of 90° to each other and adapted to hold a conductive part of the feed cable in either of two positions offset by the angle relative to the first hole, each of the holders comprising a pair of clips flanking the first hole, each of the clips being U-shaped and adapted to grip the conductive part of the feed cable with the conductive part extending across the first hole and the ribbon conductor extending through the first hole and wrapped at least partially around the conductive part.

* * * * *